United States Patent
Gostev (10) Patent No.: US 8,761,181 B1
(45) Date of Patent: Jun. 24, 2014

(54) PACKET SEQUENCE NUMBER TRACKING FOR DUPLICATE PACKET DETECTION

(71) Applicant: Cubic Corporation, San Diego, CA (US)

(72) Inventor: Anatoli Gostev, San Jose, CA (US)

(73) Assignee: Cubic Corporation, San Diego, CA (US)

( * ) Notice: Subject to any disclaimer, the term of this patent is extended or adjusted under 35 U.S.C. 154(b) by 0 days.

(21) Appl. No.: 14/046,329

(22) Filed: Oct. 4, 2013

Related U.S. Application Data (60) Provisional application No. 61/814,093, filed on Apr. 19, 2013.

(51) Int. Cl.
*H04L 12/28* (2006.01)

(52) U.S. Cl.
USPC .......................................................... 370/393

(58) Field of Classification Search
USPC ................... 370/392, 393, 394, 349; 709/238
See application file for complete search history.

(56) References Cited

U.S. PATENT DOCUMENTS

| | | | | |
|---|---|---|---|---|
| 5,548,649 A * | 8/1996 | Jacobson | | 713/153 |
| 7,114,024 B2 * | 9/2006 | Herbst | | 711/100 |
| 7,116,645 B2 * | 10/2006 | Morvan et al. | | 370/278 |
| 7,730,191 B2 * | 6/2010 | Otsuka et al. | | 709/227 |
| 7,936,757 B2 * | 5/2011 | Zhang et al. | | 370/392 |
| 8,019,918 B2 * | 9/2011 | Otsuka et al. | | 710/36 |
| 8,064,483 B2 * | 11/2011 | Ooshima | | 370/474 |
| 8,224,369 B2 * | 7/2012 | Ohwatari et al. | | 455/522 |
| 8,310,347 B2 * | 11/2012 | Keller | | 340/10.52 |
| 8,331,251 B2 * | 12/2012 | Suzuki et al. | | 370/252 |
| 8,493,931 B1 * | 7/2013 | Nix | | 370/331 |
| 2003/0110344 A1 * | 6/2003 | Szczepanek et al. | | 711/100 |
| 2004/0059766 A1 * | 3/2004 | Yeh | | 708/406 |
| 2006/0187834 A1 * | 8/2006 | Nichols et al. | | 370/230 |
| 2006/0242313 A1 * | 10/2006 | Le et al. | | 709/230 |
| 2008/0186990 A1 * | 8/2008 | Abali et al. | | 370/419 |
| 2008/0304491 A1 * | 12/2008 | Scott et al. | | 370/396 |
| 2010/0014542 A1 * | 1/2010 | Ooshima | | 370/474 |
| 2010/0097931 A1 * | 4/2010 | Mustafa | | 370/235 |
| 2010/0272182 A1 * | 10/2010 | Watanabe | | 375/240.16 |
| 2010/0287331 A1 * | 11/2010 | Kuo | | 711/103 |
| 2011/0085584 A1 * | 4/2011 | Wei et al. | | 375/211 |
| 2011/0093536 A1 * | 4/2011 | Wentink | | 709/204 |
| 2011/0099631 A1 * | 4/2011 | Willebeek-LeMair et al. | | 726/23 |

(Continued)

FOREIGN PATENT DOCUMENTS

EP    2001152 A2 * 12/2008

OTHER PUBLICATIONS

Internet Protocol, RFC 791, Internet Engineering Task Force, Sep. 1981.*

(Continued)

*Primary Examiner* — Mark Rinehart
*Assistant Examiner* — Peter Solinsky
(74) *Attorney, Agent, or Firm* — Kilpatrick Townsend & Stockton LLP (57) ABSTRACT

Techniques are disclosed for tracking of packets in wireless networks. Embodiments generally include a network device that maintains a data structure for tracking received packets. The data structure includes records associated with the received packets. A bitmapped sequence field is used to track multiple packets in one record reducing memory storage and computational power necessary to maintain the data structure.

19 Claims, 6 Drawing Sheets

| Entry | Source MAC | Start ID | Sequence |
|---|---|---|---|
| 1 | 0x000000000000012 | 0x0000 | 0xFFFFFFFF |
| 2 | 0x000000000000012 | 0x0FE0 | 0xF1FFEFFF |
| 3 | 0x000000000000014 | 0x0001 | 0xFFFFFFFF |
| ... | ... | ... | ... |

(56) References Cited

U.S. PATENT DOCUMENTS

| | | | |
|---|---|---|---|
| 2011/0219208 A1* | 9/2011 | Asaad et al. | 712/12 |
| 2011/0225305 A1* | 9/2011 | Vedantham et al. | 709/227 |
| 2011/0275328 A1* | 11/2011 | Kwon et al. | 455/67.11 |
| 2011/0294474 A1* | 12/2011 | Barany et al. | 455/414.1 |
| 2012/0063443 A1* | 3/2012 | Park et al. | 370/345 |
| 2012/0076143 A1* | 3/2012 | Liu | 370/390 |
| 2012/0117354 A1* | 5/2012 | Tatsumura et al. | 711/200 |
| 2012/0170592 A1* | 7/2012 | Dudkowski et al. | 370/419 |
| 2012/0197847 A1* | 8/2012 | Yang et al. | 707/679 |
| 2012/0257628 A1* | 10/2012 | Bu et al. | 370/392 |
| 2013/0070880 A1* | 3/2013 | Tell | 375/354 |
| 2013/0083722 A1* | 4/2013 | Bhargava et al. | 370/315 |
| 2013/0086279 A1* | 4/2013 | Archer et al. | 709/233 |
| 2013/0152189 A1* | 6/2013 | Lee et al. | 726/13 |
| 2013/0222046 A1* | 8/2013 | Furlan | 327/516 |
| 2013/0227152 A1* | 8/2013 | Lee et al. | 709/227 |
| 2013/0242731 A1* | 9/2013 | Klausler | 370/230 |
| 2013/0286973 A1* | 10/2013 | Selia et al. | 370/329 |
| 2013/0287024 A1* | 10/2013 | Herberg et al. | 370/392 |
| 2013/0294259 A1* | 11/2013 | Lee et al. | 370/248 |

OTHER PUBLICATIONS

Clark, David, IP Datagram Reassembly Algorithms, RFC 815, Internet Engineering Task Force, Jul. 1982.*

Zhao, Yanrong; Yuan, Ruan; Wang, Weiping; Meng, Dan; Zhang, Shubin; Li, Jun, A Hardware-based TCP Stream State Tracking and Reassembly Solution for 10G Backone Traffic, 2012 IEEE Seventh International Conference on Networking, Architecture, and Storage, 978-0-7695-4722-0/12 $26.00 © 2012 IEEE.*

Zhao, Yanrong; Yuan, Ruan; Wang, Weiping; Meng, Dan; Zhang, Shubin; Li, Jun; A Hardware-based TCP Stream State Tracking and Reassembly Solution for 10G Backbone Traffic, 978-0-7695-4722-0/12 $26.00 © 2012 IEEE.*

* cited by examiner

| Entry | Source MAC | Packet ID |
|---|---|---|
| 1 | 0x0000000000000012 | 0x0001 |
| 2 | 0x0000000000000012 | 0x0002 |
| 3 | 0x0000000000000014 | 0x0001 |
| ... | ... | ... |

FIG. 3A

| Entry | Source MAC | Start ID | Sequence |
|---|---|---|---|
| 1 | 0x0000000000000012 | 0x0000 | 0xFFFFFFFF |
| 2 | 0x0000000000000012 | 0x0FE0 | 0xF1FFEFFF |
| 3 | 0x0000000000000014 | 0x0001 | 0xFFFFFFFF |
| ... | ... | ... | ... |

PACKET SEQUENCE NUMBER TRACKING FOR DUPLICATE PACKET DETECTION

CROSS-REFERENCES TO RELATED APPLICATIONS

The present application claims benefit of U.S. Provisional Application No. 61/814,093, filed on Apr. 19, 2013, entitled "Packet Sequence Number Tracking for Duplicate Packet Detection," the entire contents of which are incorporated by reference herein for all purposes.

STATEMENT AS TO RIGHTS TO INVENTIONS MADE UNDER FEDERALLY SPONSORED RESEARCH AND DEVELOPMENT

The U.S. Government may have rights in this invention pursuant to Contract No. ARINC 400-10.

BACKGROUND OF THE INVENTION

The present invention relates to systems for tracking and identifying packets and packet sequence numbers in a network.

In many networks, messages may be divided into smaller packets for transmission. A message that is being transmitted from a source node to a destination node may be divided into more than one packet at a source node before transmission. At a destination node, the packets may be reassembled, in the proper order, to recreate the message. During transmission some packets may be lost, arrive out of order, become duplicated, become corrupt, and the like. To prevent missing packets, duplicates, and the like, the packets may be assigned a sequence number or unique identifiers and nodes in the network may track the receipt, acknowledgement, and transmission of the packets. Keeping a list of the received, transmitted, and/or acknowledged packets may allow nodes to detect missing packets, duplicates, network loops, performance problems, unreliable links, and the like.

Keeping track of packets using traditional methods and data structures may require considerable processing capabilities and/or data storage requirements. In many networks, nodes may have limited processing, data storage, and/or power resources. Nodes may be simple low power sensors, for example, with a limited power budget and data storage resources. Keeping track of packets using existing techniques may reduce the life span of the node due to increased processing and hence power consumption, may reduce data storage available for data logging, and the like.

Thus what is needed is an improved methods, systems, and apparatus for tracking packets and packet sequences.

BRIEF SUMMARY OF THE INVENTION

Techniques are disclosed for tracking of packets in a wireless network. Network devices include a data structure for tracking received packet sequences. The data structure maintains a list of received packets. The list of received packets may be checked each time a new packet is received to check if the received packet is a duplicate. Duplicate packets may be eliminated in the network. A bitmapped sequence field in the data structure is used track multiple packets. Each bit of the sequence field may be used to track a different packet reducing memory storage and computational requirements necessary to track packet in the network.

According to an embodiment, a system for tracking a packet ID of a received message packet at a node of a network is provided. The system includes a data structure comprising one or more records. Each record comprises a start field, the start field indicating the lowest value of the packet ID tracked by the record, and a sequence field, the sequence field configured to track more than one packet ID. The system further includes a packet tracking module configured to update the data structure based on the received message packet by locating a first record of the data structure with the start field indicative that the first record is used to track the message packet, and updating the sequence field of the first record by changing one or more bits of the sequence field to indicate receipt of a packet with the packet ID.

The system may further be configured such that each bit of the sequence field may be used to track a different packet ID related to the start field. In some cases the ith bit of the sequence field may be configured to track the packet ID equal to the value of the start field plus i+1. In some embodiments of the system, the data structure may further include a packet source address. In some embodiments, the packet tracking module changes the bits of the sequence field from one to zero during updating of the record. In some embodiments, the packet tracking module changes the bits of the sequence field from zero to one during updating of the record. In some embodiments, the packet tracking module changes the bits of the sequence field according to a monotonically increasing or monotonically decreasing functions during updating of the record. In some embodiments of the system, all bits of the sequence field may be initialized to all ones when a new record is created in the data structure.

According to another embodiment, there is provided a method for tracking received packets at a node of a network. The method includes maintaining, by a processor unit, a data structure of received packets in memory, the data structure may include one or more records wherein each record may include a first field and a second field. The method further may include receiving, by a communication interface a message packet, the message packet comprising a packet ID, and locating, by the processor unit, a first record of the one or more records of the data structure. The first record may correspond to the message packet and a value of the first field of the first record may be indicative that the first record is used to track the message packet. The method may also include updating, by the processor unit, the value of the second field of the first record based on the packet ID of the message packet. The updating may include changing the value of a bit of the second field, the bit corresponding to the packet ID. In some embodiments, each bit of the second field may be configured to track a different packet ID and the ith bit of the second field may be configured to track the packet ID equal to the value of the first field plus i+1. In some embodiments, the data structure may include a packet source address field. In some embodiment, updating the value of the second field of the record of the data structure may include changing one or more bits of the second field according to a monotonically decreasing or monotonically decreasing function.

DETAILED DESCRIPTION OF THE INVENTION

Embodiments of the present invention provide an efficient method of tracking packet sequence numbers in wireless mesh and other data communication networks. Tracking packet sequence numbers may be useful for detecting duplicate packets, missing packets, identifying network problems, and/or the like.

The methods and systems of the present invention require a relatively small amount of system memory (e.g. random access memory (RAM), flash memory, etc.) for tracking the packets compared to traditional methods and systems. The methods and systems are adaptable and useful when the data storage of the device used non-volatile memory, such as flash memory, with limited write/erase cycles.

Wireless networks and wireless network devices (including wireless sensor devices (WSDs)) described herein may be configured in a variety of ways, in a variety of contexts. Example configurations include mesh, point-to-point, and/or ad hoc networks, among others. Although disclosed embodiments focus on wireless technologies, the techniques described herein can be applied to wired communication networks, such as an ad-hoc serial interface, for example.

Figure 1:
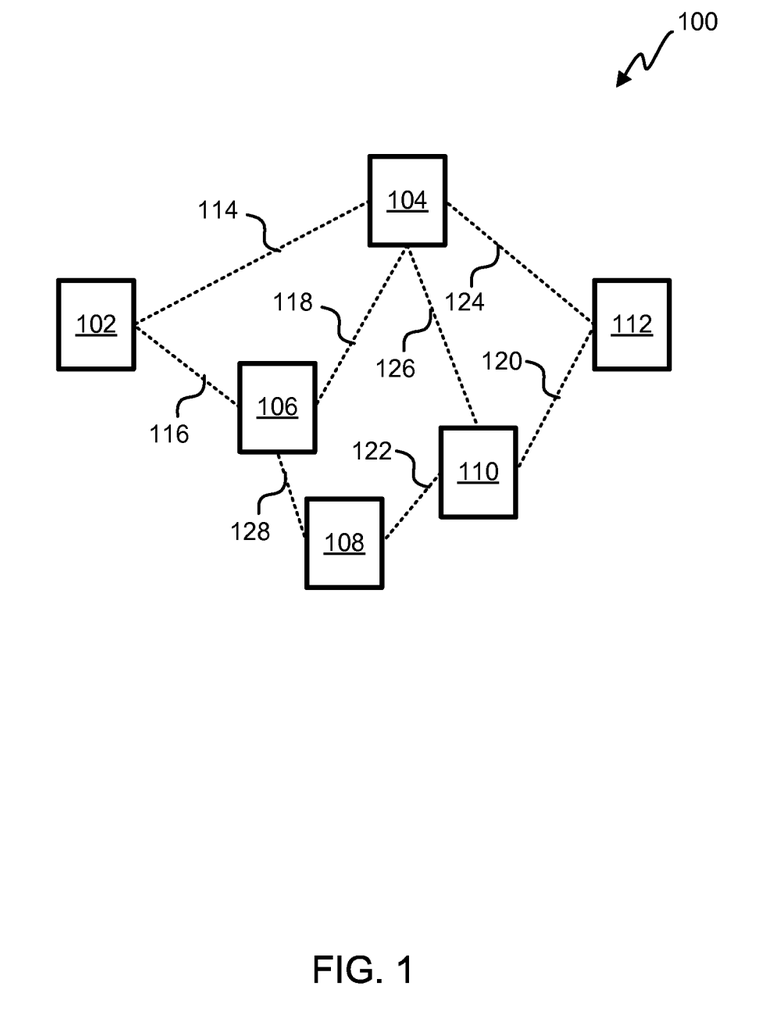
FIG. 1 is a block diagram of an embodiment of a wireless network.

FIG. 1 shows a topology of one example of a communication network 100 which may utilize the techniques described herein. The network 100 includes nodes 102, 104, 106, 108, 110, 112 and communication links 114, 116, 118, 120, 122, 124, 126, 128 between the nodes. The communication links may be physical (i.e., a conventional wire), wireless, virtual, and the like. The nodes in the network may be of the same type or maybe different with different computational capabilities for example. Some nodes may be fixed, other movable. The topology of the network may change as the nodes move in the network. A node may transmit a message to other nodes in the network. The message may be divided into multiple packets according to a protocol utilized by the network. The packets may include additional information in addition to parts of the message. The additional information may include header information that includes a packet serial or identification number and/or routing information, node source and destination identifiers and/or the like.

In embodiments, packets may be routed from a source node to a destination node via one or more paths through the network according to one or more routing protocols. The routing of the packets comprising a message may change during transmission due to a change in topology, network congestion, node failures, and the like. In embodiments, packets of a message may be transmitted to multiple nodes and simultaneously routed via more than one path. Due to network disruption, changes in topology, communication link failure, and/or the like packets of a message may be lost, duplicated, arrive out of order, and/or the like. To detect packet duplication, missing packets, and the like, the nodes of the network may maintain a table and/or other data structure to keep track of received and/or transmitted packets. Packets may be tracked by their sequence number, identification number, unique header information, their source, destination, and/or other identifying information. In embodiments the packets may be tracked at the source and/or destination nodes of a message. In some embodiments, packets may be tracked at each node of the network. Intermediate nodes, or routing nodes, that are not a source nor a destination node for a message may also track packets.

For example, a wireless network can comprise a plurality of WSDs providing sensor information relating to a plurality of cargo containers located in a depot. The sensor information can include data from a variety of sensors, which can indicate the temperature and/or humidity of a container, whether the container door is or has been opened, whether the container is experiencing or has experienced a shock, the location of the container, whether the container is moving, and more. The sensor information may be transmitted via one or more packets to other WSD's or other nodes, such as a gateway, in the network. As WSD-equipped containers enter and leave the depot, the network topology may change and adjust accordingly. WSDs and other nodes in the network may act as routers to relay data packets from other nodes that are not in direct communication.

Figure 2:
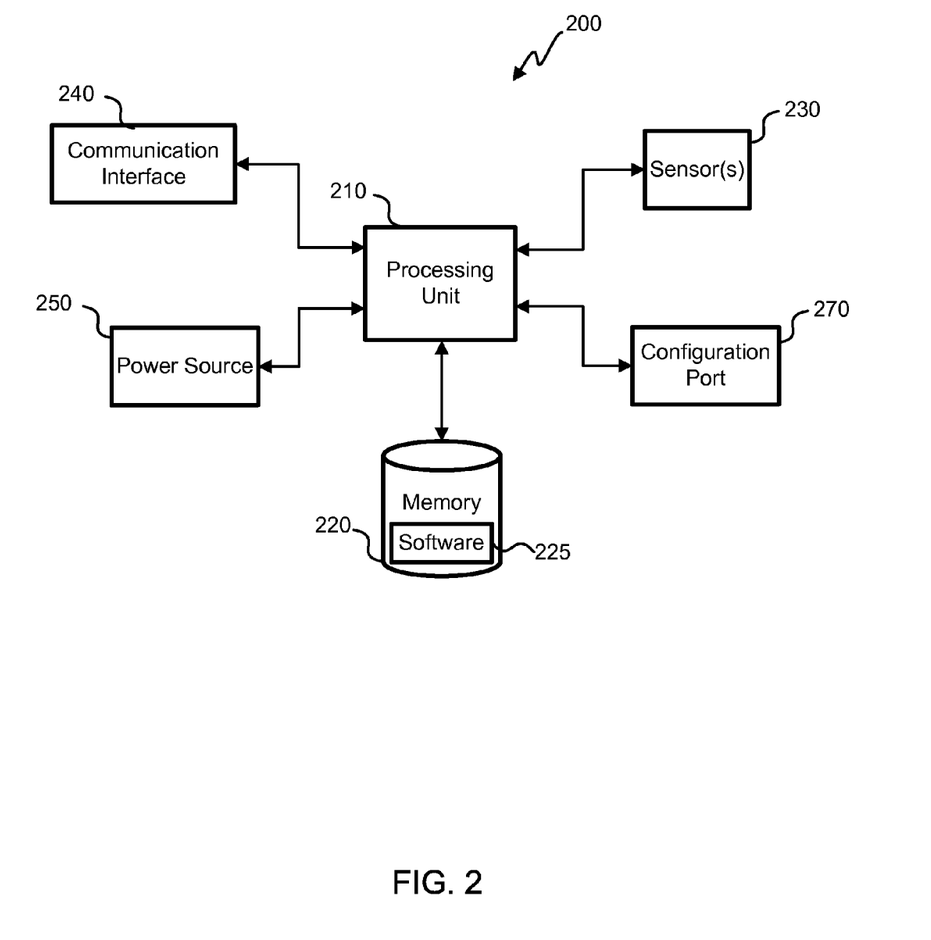
FIG. 2 is a block diagram of an embodiment of a wireless sensor device.

FIG. 2 is a block diagram of an embodiment of a network node which may be a WSD 200. This embodiment may include components such as the sensor(s) 230, processing unit 210, memory 220, and a communication interface 240 which may be wireless. In some embodiments, the components may be optimized for cost and/or power consumption. For example, the processing unit 210 can comprise a microprocessor and the memory 220 and software 225 can comprise programmed logic of the microprocessor. WSD 200 may further include a power source 250 such as a battery, solar array, fuel cell, or other source of electrical energy.

Referring now to FIG. 1, nodes may communicate with other nodes directly or indirectly and other nodes may be used to route or relay messages. In embodiments, packets in the network may be routed through the network via multiple nodes, paths, hops, and the like. Packets pertaining information to one message may be routed via different paths in the network. For example, packets transmitted from the source node 102 to the destination node 112 via one or more paths in the network using one or more intermediate nodes. A packet from the source node 102 to the destination node 112 may be routed through intermediate nodes 106, 104 or alternatively via intermediate notes 106, 108, 110, for example. During packet transmission, packets may be lost, duplicated, and/or loops in routing may develop due to changes in the topology, unreliable links or nodes, congestion, routing errors, and/or the like. For example, due to a routing error a packet transmitted from the source node 102 to the destination node 112 may not make it to the destination node 112 but may instead get routed in a loop in the intermediate nodes 104, 110, 108, 106. The cyclical routing of packets may cause unnecessary network congestion and power consumption while the destination node may not receive the packet.

Missing packets, duplicate packets, loops or cyclical routing, and/or other transmission and routing disruptions may be prevented by tracking the receipt and/or transmission of packets at the nodes. In embodiments, packets may include a header or other additional information allowing the tracking and identification of packets in a network. Packets may include any number of additional fields, bits, headers, footers, and the like appended to the data or message of the packet according to or in compliance to one or more network protocols, routing protocols, and/or the like. In embodiments packets may include a sequence number or identifier, and a source node identifier such as a media access control (MAC) address, for example. In some embodiments the packets pertaining to a particular message or data transmission may have a sequence number that is incremented for each packet.

Figure 3A:
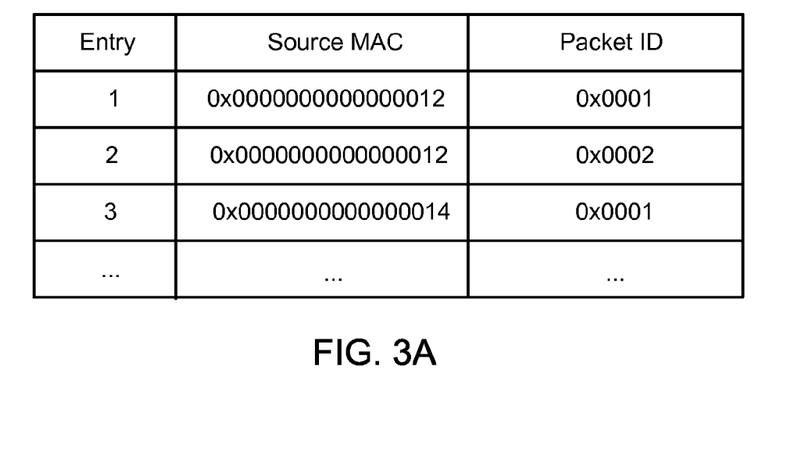
FIG. 3A is a diagram of one embodiment of a routing cache table.

Nodes may track the received and/or transmitted packets by maintaining a data structure such as a routing cache table. The routing cache table may include records with one or more data fields allowing tracking of received and/or transmitted packets. One embodiment of a table is shown in FIG. 3A. The table may include source MAC field and a packet ID field (column) for each record (row) in the table. In embodiments, the MAC address can be an 8-byte long IEEE EUI-64 source address or identifier. In embodiments the packet sequence number may be a 16 or 32 bit unsigned integer, for example. In some embodiments, the width of each field may be related to the architecture and bus or memory width of the nodes of a network. A network which predominately uses a 32 processors in its network may preferably utilize field widths that are 32 bits. In some embodiments the field widths may be dictated by protocol requirements, compatibility, or other requirements.

Destination nodes or intermediate/routing nodes that receive packets may track the receipt of the packets with entries in the routing cache table. Each time a node receives a new packet, the node may check if the packet is a duplicate packet by comparing the source MAC address and packet ID with the entries in the table. For each new packet received that is not in the table, the receiving node may record the source MAC address and the sequence number of each packet in a new record in the table. If a match is found the packet may be rejected as a duplicate, or an alert or indication may be signaled to other systems of modules of the node or other nodes. Missing packets may also be quickly identified, the table may be searched or parsed for consecutive packet ID number, for example. A gap in the sequence may mean a missing packet. Using a table structure, duplicate packets and missing packets may therefore be quickly identified.

The structure of the cache routing table as depicted in FIG. 3A, however, may not be optimum for resource constrained nodes and/or large networks or networks with high communication traffic. A large network with high traffic, for example, may require the routing nodes to keep a large table to track packets from all nodes. For each new packet received, node may need to store at the source MAC address and the packet ID in each record of the table. Likewise, since each new packet may require a new record in the table, the complexity of a search to identify duplicate of missing packets may also be resource intensive.

Figure 3B:
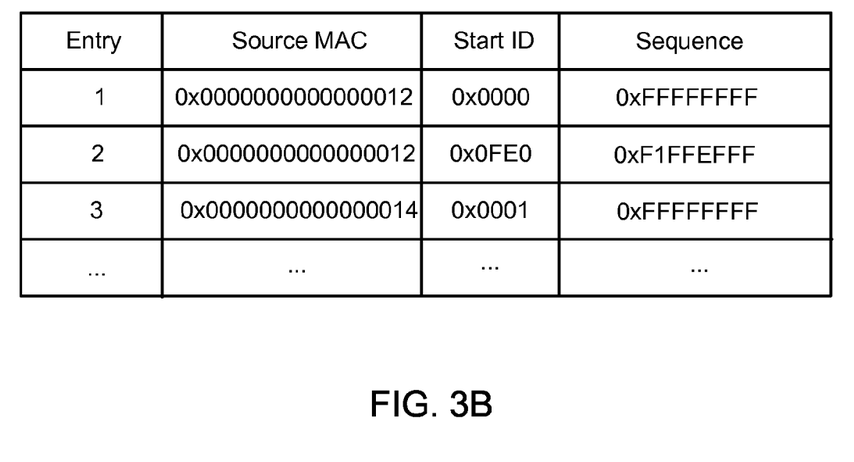
FIG. 3B is a diagram of another embodiment of a routing cache table.

In some embodiments more than one packet may be tracked with one record of the routing cache table. Tracking multiple packets with one record may reduce the size of the table and may also significantly reduce the number of times that a new record in the table has to be created. An embodiment of a modified cache routing table is shown in FIG. 3B. The table includes records (rows) with fields (columns) that include a source MAC address field, a packet start ID, and a sequence field. In this configuration, the sequence field of each record may be used to track multiple packets that correspond to the source MAC address field of each record. The sequence field of each record be encoded to track more than one packet corresponding to the MAC address of each record.

In one embodiment, each record of the table may be used to track up to P+1 different packets, where P is the bit width of the sequence field. Each bit of the sequence field may be used as an indicator if packets with a specific ID and corresponding to the MAC address of the record have been received. Each bit of the sequence field may be used to track a packet with specific packet ID. In one embodiment, each bit of the sequence may be used to track a packet ID with a value that is related to the start ID field of each record. The start ID field may be used to indicate the range of packet ID values that are mapped to the bits, how the mapping of packet IDs to the sequence field is performed, and the like.

In embodiments where packets IDs follow sequential numbering the start ID field of the table may indicate the lowest packet ID value that is tracked by the record of the table. An existence of record may indicate that a packet with the packet ID equal to the value of the start ID of the record has been received. The first bit of the sequence field may be used to track the packet with a packet ID value of the start ID+1, the second bit used to track the arrival of a packet with a packet ID value of the start ID field+2, and so on. A record with a 32-bit sequence field may therefore be used to track up to 33 different packets.

For example, when a new packet is received, an entry in the table may be created. The source MAC address and the packet ID (PID) may be extracted from the packet and populated in a record of the table. The sequence field may be initialized to an initial value of all ones or zeros. Each bit in the sequence field of the table may be used to track a packet with an ID or sequence related to the start ID of the record. In one embodiment, the state of each bit in the sequence field may represents a packet ID. The first bit of the sequence field may be used to track the packet originating from the node with the source MAC with a packet ID equal to that of the value of the start ID field plus one. The second bit of the sequence field may be used to track the packet originating from the node with the source MAC with a packet ID equal to that of the start ID field plus two. In general the $i^{th}$ bit of the sequence field may be used to track the a packet with an ID that is equal to the value of the start ID field+i+1. A zero value of the $i^{th}$ bit of the sequence field may be used to represent that the a packet with an ID of start ID+i+1 has been received.

When a packet is received that matches a source MAC address of one of the records of the table the sequence field of the table may be checked to determine if the packet has already been received by the node. The start ID field of the records with the source MAC address may be checked to determine if any of the existing records of the table are being used to track the packet ID. It no records exist a new record may be added. If a record with the specific range exists, the sequence field may be checked. If the appropriate bit of the sequence field is zero, for example, the packet may be discarded. If the appropriate bit of the sequence field is one, for example, the bit may be reset to zero to track that the packet has been received.

Using the modified routing table, each record of the table may be used to track up to P+1 different packets, where P is the number of bits of the sequence field of the table. Compared to a routing table that stores a source MAC address and a packet ID in each record (as shown in FIG. 3A, for example), a modified table with a bit mapped sequence field (as shown in FIG. 3B, for example) may reduce the memory requirements for table. For example, if the source MAC address is a 64-bit field, the packet ID and start ID fields are 16-bit fields, and the sequence field is a 32-bit field, a regular table (as shown in FIG. 3A) may require 40,000 bits to track 500 packets. The modified table (as shown in FIG. 3B), for example, may require less than 1,700 bits of storage for the table that tracks 500 different packets.

The sequence field size (number of bits) may be sized according to the message characteristics of the network and application. The sequence field size may be related to the number of packets normally used in the network to encode one message, for example. In networks where messages are short and require less than eight packets to transmit a sequence field width of 8 bits may be sufficient, for example. The sequence field may be sized according to an architecture and/or the system bus width of the processors and/or memory of the node. In embodiments, a sequence width of 8 bits, 16 bits, 32 bits, 64 bits or more may be appropriate.

In embodiments the mapping of packet sequences to a sequence field may be based on other functions. The sequence field may be encoded with a reversible function. The function may map all possible subsets of packets that are to be tracked by a record into a unique value of the sequence field. In embodiments, the function may preferably be monotonically increasing or monotonically decreasing such that adding packet ID encoded by the function only increases or decreases the value of the sequence field respectively. In some embodiments, the functions may require more than P bits to encode or track P+1 packets but may include additional error checking capability, for example.

In embodiments with network nodes comprise a digital processor, digital logic, and the like, a bit mapped sequence filed may be beneficial as it may be simple to implement in hardware. Bits in the sequence field may be checked, set, or cleared using simple logical bit operations, comparisons, shift operations, and other efficient processor instructions. In embodiments bit masks, function routines, or special hardware may be used to check, monitor, or update the table and fields.

In embodiments where the routing table is at least partially stored in non-volatile memory such as flash memory the sequence field of the table may initialized to all ones and bits may be set to a zero value as packets are received. In some memory technologies such as flash memories, memory location may be arranged and erased only in blocks. Each block or memory location may have a limited number of write and/or erase cycles after which the memory location may become unusable. Writing a memory location with a zero (i.e., zeroing a bit) may not require erasing of the memory, therefore more than one packet may be tracked in the memory without requiring an erase cycle of the memory cell or memory block. Reducing the number of erase cycles may increase the longevity of a memory. Likewise, reducing the number of erase cycles or operations may also reduce the power or energy demands of the node and thereby increasing the longevity of the node if it is battery powered.

A bitmapped sequence field for tracking packet IDs may be especially beneficial in networks where packets may frequently arrive out of order or may be lost. The bitmapped tracking allows tracking and verification of packets even if the packets are received out of order. In networks or nodes where packets are always or with a high probability received in order, the packets may be tracked by tracking the lowest and highest packet IDs received. A routing cache table may include a start ID field and a high ID field. The high ID field may keep track of the highest packet ID received. Using the table any packet with an ID in the range between the start ID and high ID may be assumed to be received. In embodiments a combination of bitmapping tracking and range ID tracking may be used. In some embodiments a node may use different techniques depending on the source of the packet. A link to one source node, for example, may be very reliable and virtually all packets may arrive in order allowing the use of range ID tracking by using a start ID field and a high ID field in a routing cache table. A communication link to another source node may be unreliable and packets may frequently arrive out of order prompting the node to use a bitmapped sequence field for tracking packets from the source node. In some embodiments a node may alternate or switch between bitmapped or range-based tracking fields and methods based on the reliability of the network, characteristics of received packets, and the like.

It is to be understood that although the routing cache table is presented diagrammatically as table, the routing cache table may be implemented and arranged in memory of the node in any number of ways. The table may be stored and arranged in memory as a flat file, indexed file, hash table, linked list, etc. Each record of the table may include additional fields such as time stamps, routing directives, and the like.

As those skilled in the art will appreciate, the encoding functions for tracking multiple packets using the sequence field of a record may be generalized to non-binary logic and memory devices. Ternary memory devices (those that store three possible values in one memory cell) may be used in embodiments and the encoding and tracking of the packets may be adapted to such memory technologies.

Figure 4:
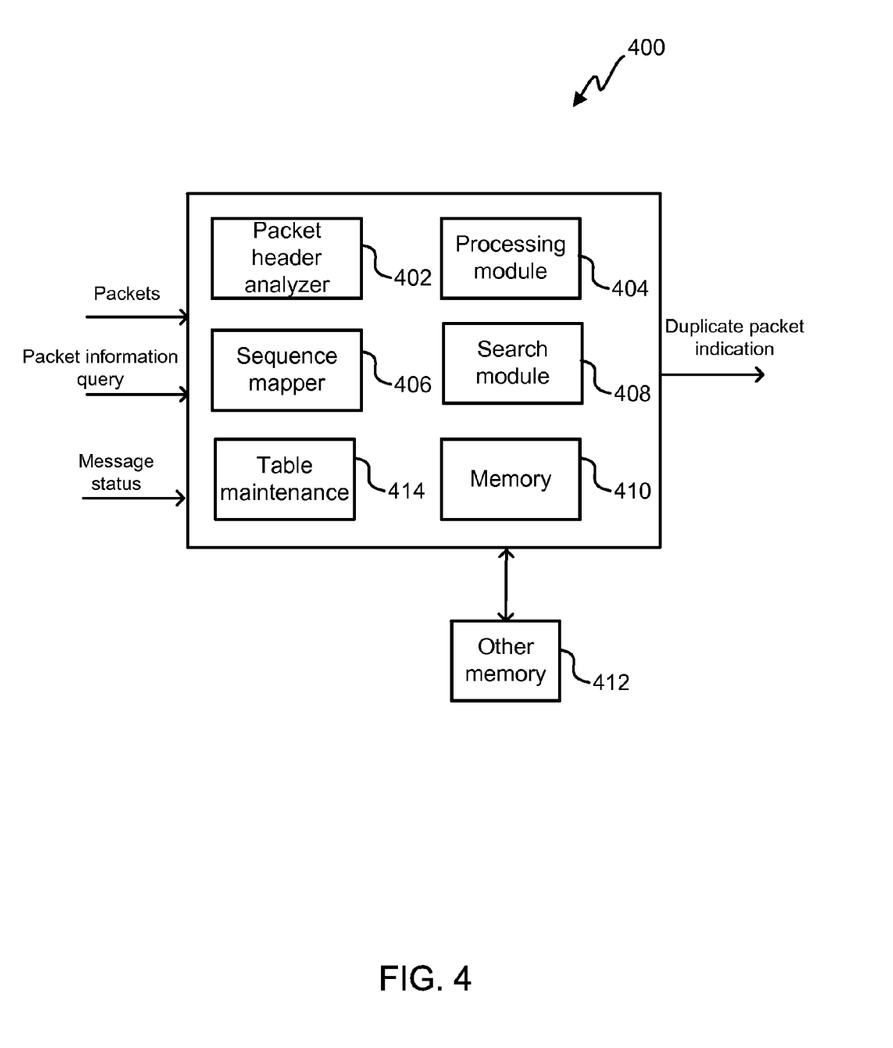
FIG. 4 is a block diagram of an embodiment of a packet tracking system.

Packet processing and packet tracking in a node may be performed by a packet tracking module. The components and modules of an embodiment of a packet tracking system of a node are depicted in FIG. 4. Modules shown in FIG. 4 may be implemented in hardware and/or software by, for example, one or more of the components of an WSD as described in relation to FIG. 2. A packet-tracking system 400, may take as input packet information. In some embodiments the system 400 may receive a complete packet. The packet header analyzer 402 module of the system 400 may process the packet to extract pertinent fields, such as a source MAC or packet ID, from the packet. In some embodiments, the system 400 may receive only the appropriate packet header information that includes the source MAC address, and packet ID fields. A query of a packet status may originate from another element of the node and may include a source MAC address and packet ID. The system may track the packet using several different modules and generate an indication if the received packet has been previously received.

In embodiments, the packet-tracking system 400 may include a memory module 410 for storing the packet routing table. The memory may dedicated memory or a memory section or block mapped from a nodes main memory. In embodiments the tables may be stored in other memory 412 on the node. The system 400 may further include a search module 408. The search module may receive the source MAC address of a packet and a packet ID and perform a search of the memories 410, 412 to determine if a record with the source MAC address and a start ID field within a range of packet ID exists. The search module 408 may perform one or more computations or look up procedures to query the table. The search module may, for example, take a hash function of the source MAC address if the table is implemented as hash table structure. For each record in the table that a matching source MAC address is found the search module may examine the start ID field of the table. Based on the start ID field and the width of the sequence field of the table, the search module may determine if a record that may track the received packet ID has been created. If corresponding records do not exists, the search module may be create a record and populate the source MAC address fields and start ID fields.

In embodiments, to populate or analyze the sequence field of the table a sequence mapper module 406 of the system 400 may be used to determine what bits of the sequence field represent the packet ID number. The sequence mapper module may read, test, set, or reset the bits of the sequence field that correspond to the received packet ID. In embodiments, the sequence mapper may, for example, use one or more bit masks and one or more logical operators such as AND, OR, and XOR operations to check or set one or more bits of the sequence field. In embodiments where the sequence field is mapped to a packet ID with a more complex function requiring non-trivial computations, the system 400 may include a processing module 404 to determine the bits and values that should be checked or set for a particular packet ID. If the sequence field needs to be updated due to a new packet ID, the updated sequence field may be stored in the appropriate record of the table.

The packet tracking system 400 may include a table maintenance module 414. The table maintenance module 414 may maintain the table, maintain the table within a predetermined size, remove old records, and the like. In resource constrained nodes, the routing table may require periodic or event triggered maintenance and scrubbing of old records to prevent the table from getting too large and overgrowing its memory allocation. In embodiments, each record of the routing table may include a time stamp field. The time stamp field may be used to mark the age of the record. When memory constraints are met, the oldest records may be purged or deleted from the memory. In some embodiments the last packet of a message may be marked with a termination sequence or identifier. Receipt of the last packet of the message may trigger the table maintenance module to purge the records related to the packets of the message.

It is to be understood that the structure, order, and number of modules, blocks, and the like shown and described in the figures of this disclosure may be changed or altered without deviating from the spirit of the disclosure. Modules may be combined or divided into multiple other modules, for example. The functionality of the modules may be implemented with software, scripts, hardware and the like. For example, modules, such as the search module 408 and the processing module 404 of the packet tracking system 400 depicted in FIG. 4 may be implemented as a software module, an application specific integrated circuit, as logic in a field programmable gate array, and the like.

Figure 5:
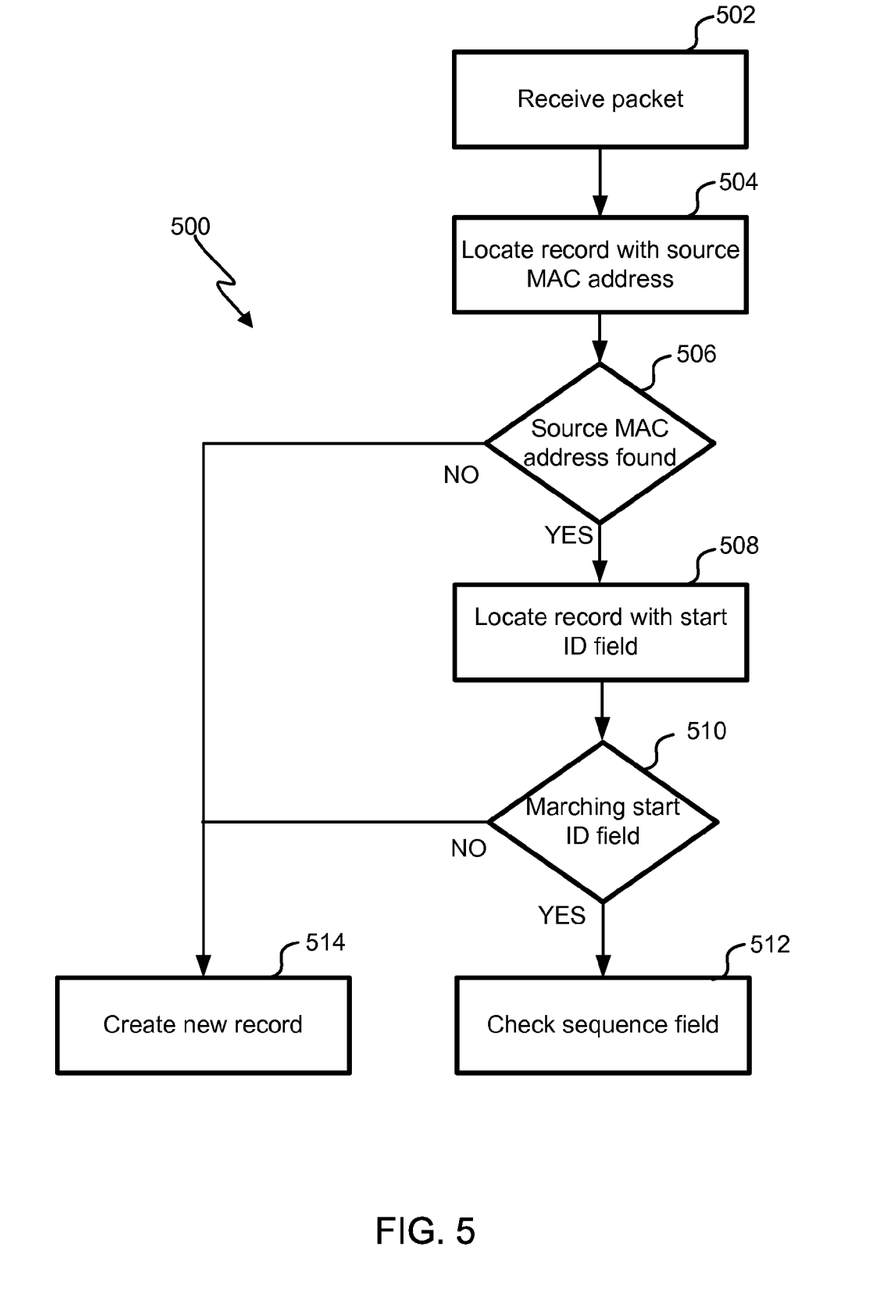
FIG. 5 is an embodiment of a method of locating records in the routing table.

FIG. 5 shows an embodiment of a method 500 for locating a specific record in the routing cache table that corresponds or may be used to track a packet with a specific packet ID.

Steps of the method shown in FIG. 5 may be implemented in hardware and/or software by, for example, one or more of the components or modules of the packet tracking system as described in relation to FIG. 4. A routing cache table may be structured as the table in FIG. 3B where each record includes a field for a source MAC address, a start ID, and sequence. When a packet is received in block 502, the source MAC address and the packet ID of the packet may be extracted or located in the packet. In block 504 the search module 408 of the packet tracking system may search for a record with a value in source MAC address field that corresponds to the source MAC address of the received packet. The search for the MAC address may include any number of search algorithms to increase the speed and efficiency of the search. If the routing cache table is implemented as a hash table, for example, the source MAC address may be used the table key or index where the record may be located by taking a hash of the source MAC address. If the corresponding source MAC address is not located in the table, a new record for tracking the packet may be created in the routing cache table in block 514.

If in block 506 a corresponding record to the source MAC address is located, the start ID field of the table is analyzed in block 508. The start ID field may indicate what range of packet ID are tracked by the sequence field of the record. In some embodiments, the start ID field represents the lowest value of a packet ID tracked by the record and the range of packet ID tracked by each record may be inferred by the size or width of the sequence field of the routing cache table. The range of packet ID may be the start ID of the record to the start ID+width of sequence field. In other embodiments other range designators may be used. The search module 408 of the packet tracking system may compare the packet ID of the received packet and determine if the ID is within the range of the packets tracked by the record based at least in part on the start ID field. If the received packet ID is not in the range of the record, the search module 408 may locate the next record with a matching source MAC address and check if the start ID of the record signifies that the record is designated to track the received packet. If no records with a matching start ID can be found a new record for tracking the packet may be created in the routing cache table in block 514. If in block 510 a record is found with a start ID that indicates that the record may be used to track the received packet the sequence field of the record may be checked in block 512 to determine if it is a duplicate packet.

Figure 6:
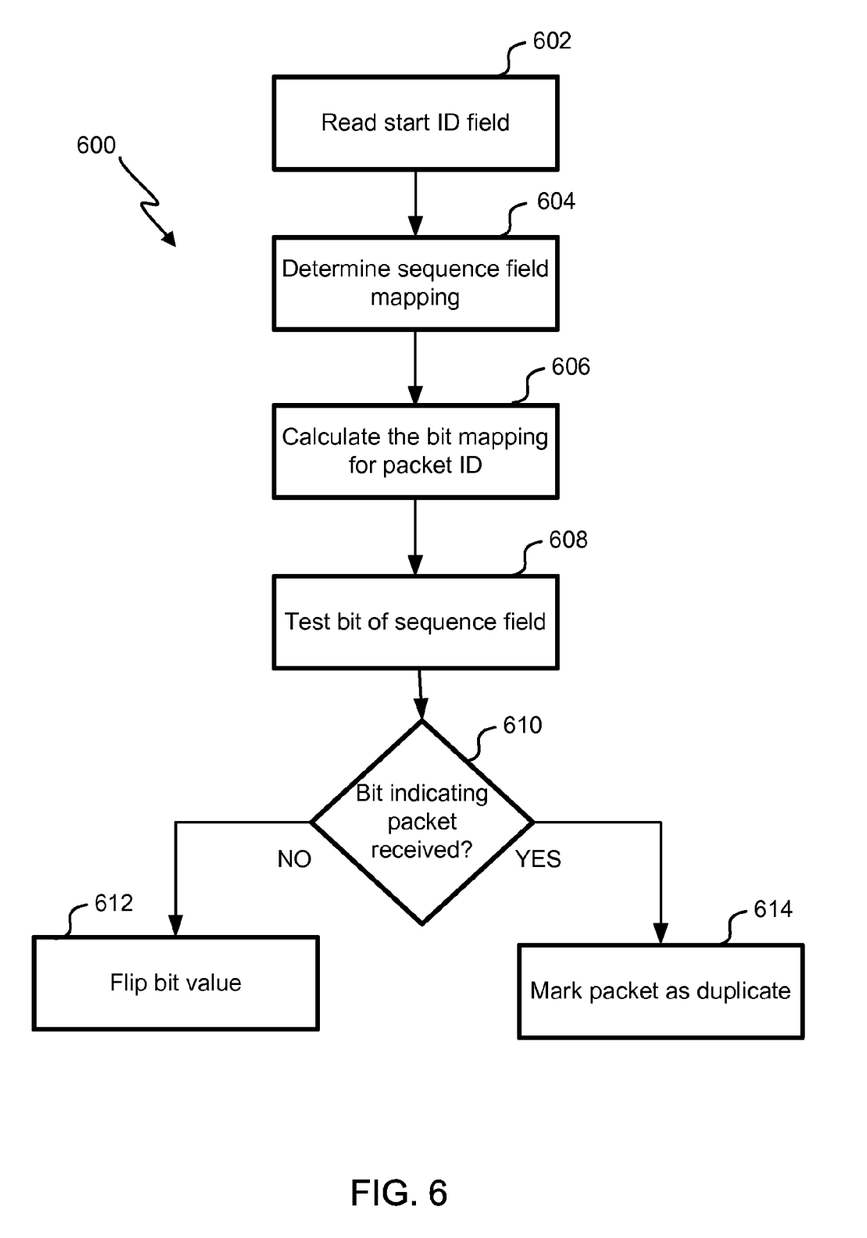
FIG. 6 is an embodiment of a method of tracking packets using a bitmapped sequence field.

FIG. 6 shows an embodiment of a method 600 for using the sequence field of a record to track a packet ID. Steps of the method shown in FIG. 6 may be implemented in hardware and/or software by, for example, one or more of the components or modules of the packet tracking system as described in relation to FIG. 4. Once a record is found or created in the routing cache table the sequence field of the record may be used to track the packet ID. In block 602 of the method, the start ID field of the record may be loaded. In embodiments, the start ID field may indicate the lowest ID of the packets that the sequence field is used to track. In block 604 the system may determine how the sequence field is used to track the packets. In embodiments the sequence field may be bit-mapped to specific packet IDs based on the start ID field as described herein. In the bitmapped implementation, the value of the start ID field of the record may indicate which bits of the sequence field may be used to track which packet IDs.

In block 606 the bitmapping for the received packet ID may be calculated by the sequence mapper 406. The sequence mapper 406 may calculate which bit location of the sequence field corresponds to the packet ID of the received packet. The bit location may be related to start ID field. In embodiments the packet ID of the received field may be mapped to the $i^{th}$ bit of the sequence field, where i is the difference between the packet ID of the received packet and the value of the start ID field.

In block 608 of the method 600, the specific bit of the sequence field may be checked or tested to determine if the packet with the packet ID has been received. In embodiments, a unset bit of "0" may indicate the packet ID has been received. If bit is set to "1" and the packet has not been previously received, the specific bit of the sequence may be flipped to indicate the receipt of the packet in block 612. If in block 610 it is determined that the bit value indicates that the packet has been previously received, the packet may be marked as a duplicate in block 614.

After a duplicate packet has been discovered, the packet tracking system may generate an indication of the duplicate packet to other elements or systems of the node. The duplicate information may be used break of discover cycles in the network, determine performance or network problems, and the like.

In the description herein, for the purposes of explanation, numerous specific details are set forth in order to provide a thorough understanding of various embodiments. It will be apparent, however, to one skilled in the art that various embodiments may be practiced without some of these specific details. In other instances, well-known structures and devices are shown in block diagram form.

The description also provides exemplary embodiments only, and is not intended to limit the scope, applicability, or configuration of the disclosure. Rather, the preceding description of the exemplary embodiments will provide those skilled in the art with an enabling description for implementing an exemplary embodiment. It should be understood that various changes may be made in the function and arrangement of elements without departing from the spirit and scope of the disclosed systems and methods as set forth in the appended claims.

Specific details are given to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, known circuits, processes, algorithms, structures, and techniques may be shown without unnecessary detail in order to avoid obscuring the embodiments.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function. It should also be appreciated that the methods described above may be performed by hardware components or may be embodied in sequences of machine-readable instructions, which may be used to cause a machine, such as a general-purpose or special-purpose processor or logic circuits programmed with the instructions to perform the methods. These machine-readable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

What is claimed is:

1. A device for tracking message packets at a node of a network, the device comprising:
   one or more processors;
   a non-transitory computer-readable storage medium storing a plurality of instructions, which, when executed by the one or more processors, cause the device to:
   receive, at the device a message packet, the message packet having a packet ID value and a source address value;
   locate a record in a memory location of the device, the record having a start ID field, address field, and a sequence field, wherein the value of the address field corresponds to the source address value of the message packet and the start ID field corresponds to the packet ID value of the message packet; and
   track the receipt of the message packet with the record using the sequence field of the record, wherein a plurality of bits in the sequence field tracks the packet ID value by mapping the packet ID value to one bit or more bits of a sequence field of the record and each bit of the sequence field of a record is used to track a different packet ID value.

2. The device of claim 1, wherein instructions for tracking to the receipt of the message packet are further configured to cause the device to map $i^{th}$ bit of the sequence field of the record to a packet ID value equal to the value of the start ID field plus i+1.

3. The device of claim 1, wherein instructions for tracking the receipt of the message packet are further configured to cause the device to update the value of the sequence field for each new message packet received, wherein during updating for each message packet a bit of the sequence field is flipped from one to zero.

4. The device of claim 1, wherein instructions for tracking the receipt of the message packet are further configured to cause the device to update the value of the sequence field for each new message packet received, wherein during updating the value of the sequence field is changed according to a monotonically increasing function.

5. The device of claim 1, wherein instructions for tracking the receipt of the message packet are further configured to cause the device to update the value of the sequence field for each new message packet received, wherein during updating the value of the sequence field is changed according to a monotonically decreasing function.

6. A system for tracking a message packet at a node of a network, the system comprising:
   a memory storing a record indicative of having received a message packet with a packet ID value and a source address value, wherein the record comprises:
   an address field, the address field storing the source address value of the message packet,
   a start field, the start field indicating the lowest value of the packet ID tracked by the record, and
   a sequence field, the sequence field having a plurality of bits and configured to track more than one packet ID value; and
   a packet tracking module configured to update the data structure based on the received message packet by:
   locating the record, wherein the address field of the record corresponds to the source address value of the message packet and the start field of the record is indicative that the record is used to track the message packet with the packet ID value, and
   updating the sequence field of the first record by changing a one or more bit of the sequence field to indicate receipt of the message packet with the packet ID value.

7. The system of claim 6, wherein each bit of the sequence field is configured to track a different packet ID value.

8. The system of claim 6, wherein the $i^{th}$ bit of the sequence field is configured to track the message packet with the packet ID value equal to the value of the start field plus i+1.

9. The system of claim 6, wherein during updating of the record, the bit of the sequence is changed from one to zero.

10. The system of claim 6, wherein during updating of the record, the bit of the sequence field is changed from zero to one.

11. The system of claim 6, wherein updating the value of the sequence field of the record comprises changing the value of the sequence field according to a monotonically increasing function.

12. The system of claim 6, wherein updating the value of the sequence field of the record of the data structure comprises changing the value of the sequence field according to a monotonically decreasing function.

13. The system of claim 6, wherein all bits of the sequence field are initialized to all ones when a new record is created.

14. A method for tracking received message packets at a node of a network, the method comprising:

maintaining, by a processor unit, a data structure of received packets in memory, the data structure including one or more records, each record comprising a first field and a second field, wherein the second field has a plurality of bits;

receiving, by a communication interface a message packet, the message packet comprising a packet ID value;

locating, by the processor unit, a first record of the one or more records of the data structure, wherein a value of the first field of the first record is indicative that the first record is used to track the message packet with the packet ID value; and updating, by the processor unit, the value of the second field of the first record based on the packet ID value of the message packet, wherein the updating comprises changing the value of a bit of the second field, wherein the bit of the second field that is changed is based on to the packet ID value of the message packet and the value of the first field.

15. The method of claim 14, wherein each bit of the second field is configured to track a different packet ID value.

16. The method of claim 14, wherein the $i^{th}$ bit of the second field is configured to track the packet ID value equal to the value of the first field plus i+1.

17. The method of claim 14, wherein the data structure further comprises a packet source address field.

18. The method of claim 14, wherein updating the value of the second field of the record of the data structure comprises changing the value of the second field according to a monotonically decreasing function.

19. The method of claim 14, wherein updating the value of the second field of the record of the data structure comprises changing the value of the second field according to a monotonically increasing function.

* * * * *